(12) United States Patent
Rosén et al.

(10) Patent No.: US 12,146,666 B2
(45) Date of Patent: Nov. 19, 2024

(54) METHOD AND CONTROL SERVER FOR CONTROLLING A DISTRICT THERMAL ENERGY DISTRIBUTION SYSTEM

(71) Applicant: E.ON SVERIGE AB, Malmo (SE)

(72) Inventors: Per Rosén, Lund (SE); Jacob Skogström, Lomma (SE); Fredrik Rosenqvist, Helsingborg (SE)

(73) Assignee: E.ON SVERIGE AB, Malmo (SE)

( * ) Notice: Subject to any disclaimer, the term of this patent is extended or adjusted under 35 U.S.C. 154(b) by 401 days.

(21) Appl. No.: 17/596,546

(22) PCT Filed: Jun. 11, 2020

(86) PCT No.: PCT/EP2020/066161
§ 371 (c)(1),
(2) Date: Dec. 13, 2021

(87) PCT Pub. No.: WO2020/249654
PCT Pub. Date: Dec. 17, 2020

(65) Prior Publication Data
US 2022/0243928 A1    Aug. 4, 2022

(30) Foreign Application Priority Data
Jun. 13, 2019 (EP) .................................... 19180029

(51) Int. Cl.
*F24D 19/10*    (2006.01)
*F24D 10/00*    (2022.01)
(Continued)

(52) U.S. Cl.
CPC ....... *F24D 19/1009* (2013.01); *F24D 10/003* (2013.01); *F24F 5/0003* (2013.01);
(Continued)

(58) Field of Classification Search
None
See application file for complete search history.

(56) References Cited

U.S. PATENT DOCUMENTS 5,540,555 A     7/1996  Corso et al.
2012/0279681 A1* 11/2012 Vaughan ............... F24D 10/003
                                                                165/96
(Continued)

FOREIGN PATENT DOCUMENTS

CN     1520502      8/2004
CN     101048624    10/2007
(Continued)

OTHER PUBLICATIONS

International Search Report and Written Opinion of PCT/EP2020/066161, Dated Aug. 17, 2020, in 10 pages.

*Primary Examiner* — David Earl Ogg
(74) *Attorney, Agent, or Firm* — Knobbe, Martens, Olson & Bear, LLP

(57) ABSTRACT

A method for controlling a district thermal energy distribution system is presented. The method comprises: determining whether a local pressure difference between a feed line (111) and a return line (112) of a distribution grid (110) is below a predetermined threshold; upon the local pressure difference is determined to be below the predetermined threshold, generating a control signal comprising information instructing a local distribution system (150) to reduce outtake of heat or cold from the distribution grid (110); sending the control signal to a local control unit (140) of the local distribution system (150); and reducing, in response to the control signal, the outtake of heat or cold of the local distribution system (150) from the distribution grid (110). The distribution grid (110) may be a district heating grid or
(Continued)

a district cooling grid. Also, a control server and a district thermal energy distribution system is presented.

16 Claims, 5 Drawing Sheets

(51) Int. Cl.
    *F24F 5/00*     (2006.01)
    *G05B 19/4155*     (2006.01)

(52) U.S. Cl.
    CPC .. *G05B 19/4155* (2013.01); *F24D 2220/0292* (2013.01); *G05B 2219/50333* (2013.01)

(56) References Cited

U.S. PATENT DOCUMENTS

| | | |
|---|---|---|
| 2013/0048114 A1 | 2/2013 | Rothman et al. |
| 2017/0268791 A1 | 9/2017 | Luo et al. |
| 2018/0156472 A1 | 6/2018 | Rothman et al. |
| 2018/0259197 A1 | 9/2018 | Rosen et al. |

FOREIGN PATENT DOCUMENTS

| | | | | |
|---|---|---|---|---|
| CN | 101604160 | A | 12/2009 | |
| CN | 102721104 | | 10/2012 | |
| CN | 204329158 | | 5/2015 | |
| CN | 204438287 | | 7/2015 | |
| CN | 108474566 | | 8/2018 | |
| CN | 108603667 | | 9/2018 | |
| CN | 108603668 | | 9/2018 | |
| CN | 108679683 | | 10/2018 | |
| CN | 109477643 | | 3/2019 | |
| CN | 109642737 | | 4/2019 | |
| CN | 109716031 | | 5/2019 | |
| CN | 109790983 | | 5/2019 | |
| EP | 3165831 | | 5/2017 | |
| EP | 3165831 | A1 * | 5/2017 | ............. F24D 10/00 |
| EP | 3184914 | | 6/2017 | |
| EP | 3184914 | A1 * | 6/2017 | ........... F24D 10/003 |
| EP | 3296647 | A1 * | 3/2018 | ........... F24D 10/003 |
| EP | 3312698 | A1 | 4/2018 | |
| EP | 3399246 | | 11/2018 | |
| JP | 2019-521305 | A | 7/2019 | |
| WO | WO 0225176 | | 3/2002 | |
| WO | WO 02090832 | | 11/2002 | |
| WO | WO 2017076866 | | 5/2017 | |
| WO | WO 2018160200 | | 9/2018 | |
| WO | WO2002025176 | A1 * | 3/2022 | |

* cited by examiner

METHOD AND CONTROL SERVER FOR CONTROLLING A DISTRICT THERMAL ENERGY DISTRIBUTION SYSTEM

FIELD OF INVENTION

The invention relates to a controlling of district thermal energy distribution system. The district thermal energy distribution system may be a district heating system or a district cooling system.

TECHNICAL BACKGROUND

Nearly all large developed cities in the world have at least two types of energy distribution grids incorporated in their infrastructures: one grid for providing heating and one grid for providing cooling. The grid for providing heating may e.g. be used for providing comfort and/or process heating, and/or hot tap water preparation. The grid for providing cooling may e.g. be used for providing comfort cooling and/or process cooling.

A common grid for providing heating is a gas grid or an electrical grid providing comfort and/or process heating, and/or hot tap water preparation. An alternative grid for providing heating is a district heating grid. The district heating grid is used for providing heated heat transfer fluid, typically in the form of water, to buildings of the city. A centrally placed heating and pumping plant is used for heating and distributing the heated heat transfer fluid. The heated heat transfer fluid is delivered to the buildings via one or more feed conduits and is returned to the heating and pumping plant via one or more return conduits. Locally at a building, heat from the heated heat transfer fluid is extracted via a district heating substation comprising a heat exchanger.

A common grid for providing cooling is the electrical grid. The electricity may e.g. be used for running refrigerators or freezers or for running air conditioners for providing comfort cooling. An alternative grid for providing cooling is a district cooling grid. The district cooling grid is used for providing cooled heat transfer fluid, typically in the form of water, to buildings of the city. A centrally placed cooling and pumping plant is used for cooling and distributing the thus cooled heat transfer fluid. The cooled heat transfer fluid is delivered to the buildings via one or more feed conduits and is returned to the cooling and pumping plant via one or more return conduits. Locally at a building, cold from the cooled heat transfer fluid is extracted via a heat exchanger.

The use of energy for heating and/or cooling is steadily increasing, influencing the environment negatively. By improving utilization of the energy distributed in the energy distribution grids, negative influences on the environment may be reduced. Hence, there is a need for improving utilization of the energy distributed in energy distribution grids, including existing grids. Provision of heating/cooling also requires huge investments when it comes to engineering projects and there is a constant strive to cut the costs. Hence, there is a need for improvements in how to provide sustainable solutions to heating and cooling of a city.

SUMMARY OF INVENTION

It is an object of the present invention to provide improvements in how to provide heating and/or cooling to a city.

According to a first aspect a method for controlling a district thermal energy distribution system is provided. The district thermal energy distribution system comprising: a distribution grid for a liquid based distribution of heat or cold, the distribution grid comprising a feed line and a return line; and a plurality of local control units, each local control unit being associated with a local distribution system connected to the distribution grid and configured to distribute heat or cold in a building, each local control unit further being configured to control an outtake of heat or cold of the associated local distribution system from the distribution grid. The district thermal energy distribution system may further comprise a production plant configured to produce heat or cold, to deliver the heat or cold to a district thermal liquid of the distribution grid, and pump the heated or cooled district thermal liquid from the production plant out into the distribution grid. The method comprises: determining whether a local pressure difference between the feed line and the return line of the distribution grid at a location of the distribution grid where a first local distribution system is connected to the distribution grid is below a predetermined threshold; upon the local pressure difference is determined to be below the predetermined threshold, generating a control signal associated with a local control unit of a second local distribution system, the second local distribution system being different from the first local distribution system, the control signal comprising information instructing the second local distribution system to reduce outtake of heat or cold from the distribution grid; sending the control signal to the local control unit of the second local distribution system; receiving the control signal at the local control unit of the second local distribution system; and reducing, in response to the control signal, the outtake of heat or cold of the second local distribution system from the distribution grid.

In a situation where the differential pressure far out in the distribution grid is close to its minimum, i.e. is below the predetermined threshold, the present method may reduce demand for outtake of heat or cold from the distribution grid and hence increase the differential pressure far out in the distribution grid. This may allow for growth in the distribution grid, i.e. addition of new local distribution systems to the distribution grid. Such a growth is made possible without having to invest in pipes, pumps or additional production plants.

The step of determining whether the local pressure difference between the feed line and return line of the distribution grid at the location of the distribution grid where the first local distribution system is connected to the distribution grid is below the predetermined threshold comprises: measuring the local pressure difference between the feed line and return line at the location of the distribution grid where the first local distribution system is connected to the distribution grid; and comparing the measured local pressure difference with the predetermined threshold.

The second local distribution system may be connected to the distribution grid upstream the first local distribution system as seen along a flow path of the district thermal liquid from the local production plant.

The information instructing the second local distribution system to reduce outtake of heat or cold from the distribution grid may comprises an offset, wherein the step of reducing the outtake of heat or cold of the second local distribution system from the distribution grid may comprise: determining, at the local control unit of the second local distribution system, a steering temperature based on a temperature outside the building to which the second local distribution system is configured to distribute heat or cold; adjusting, at the local control unit of the second local distribution system, the steering temperature using the offset; and controlling the second local distribution system's outtake of heat or cold from the distribution grid based on the adjusted steering temperature. Using a control signal comprising an off-set may simplify the controlling. This since, the local control unit does not need to be specially designed for the controlling to function. For example, local control unit does not need to know that it is being manipulated by offsetting a steering parameter, e.g. an outdoor temperature, of the local control unit. Hence, a steering of the local control unit may be made without it knowing anything about how the steering is made.

According to a second aspect a control server is provided. The control server is configured to control outtake of heat or cold from a distribution grid. The distribution grid comprising a feed line and a return line. The control server comprising: a transceiver configured to communicate with control units of local distribution systems connected to the distribution grid, and with local pressure difference determining devices each configured to measure a local pressure difference of the distribution grid at a location of the distribution grid where the respective local distribution system is connected to the distribution grid; and a control circuit. The control circuit is configured to execute: a pressure evaluation function, a local distribution system finding function, and a control signal generating function. The pressure evaluation function is configured to: monitor local pressure differences reported by the local pressure difference determining devices, determine whether a reported local pressure difference is below a predetermined threshold, and upon the reported local pressure difference is below the predetermined threshold, generate a pressure alert signal comprising information identifying a first local distribution system associated with the local pressure difference determining device) that reported the local pressure difference being below the predetermined threshold. The local distribution system finding function is configured to locate a second local distribution system different from the first local distribution system. The control signal generating function is configured to generate a control signal for a local control unit associated with the second local distribution system, the control signal comprising information instructing the second local distribution system to reduce its outtake of heat or cold from the distribution grid. The transceiver is further configured to send the control signal to the local control unit associated with the second local distribution system.

The local distribution system finding function may further be configured to locate the second local distribution system upstream the first local distribution system as seen along a flow path of district thermal liquid in the feed line.

The pressure alert signal may further comprise information pertaining to a difference between the reported local pressure difference and the predetermined threshold. Hence, a value of an amount of reduction of outtake of heat or cold may be provided.

The control server may further comprise a database comprising entries of individual predetermined thresholds of local pressure difference for the local distribution systems connected to the distribution grid.

The control signal may comprise an off-set pertaining to how much the outtake of heat or cold shall be reduced.

The control signal may comprise information related to for how long time the outtake of heat or cold shall be reduced.

The control server may further comprise a database comprising entries of thermal inertia of the building being heated or cooled by the respective local distribution system.

The off-set pertaining to how much the outtake of heat or cold shall be reduced may be dependent on the thermal inertia of the building being heated or cooled by the second local distribution system.

The time period of temporary reduction of outtake of heat or cold may be dependent on a value of thermal inertia of the building being heated or cooled by the second local distribution system.

The above mentioned features of the first aspect, when applicable, apply to this second aspect as well. In order to avoid undue repetition, reference is made to the above.

According to a third aspect a district thermal energy distribution system is provided. The district thermal energy distribution system comprises: a distribution grid for a liquid based distribution of heat or cold, the distribution grid comprising a feed line and a return line; a plurality of local distribution systems connected to the feed and return lines of the distribution grid and configured to distribute heat or cold in a building associated with the respective local distribution system; a plurality of local control units, each local control unit being associated with a respective local distribution system of the plurality of local distribution systems, each local control unit being configured to control the thereto associated local distribution system's outtake of heat or cold from the distribution grid; a plurality of local pressure difference determining devices each being associated with a respective local distribution system and being configured to measure a local pressure difference of the distribution grid at a location of the distribution grid where the respective local distribution system is connected to the distribution grid; and a control server according to the second aspect.

The district thermal energy distribution may further comprise a production plant configured to produce heat or cold and to deliver the heat or cold to a district thermal liquid of the feed line of the distribution grid.

The district thermal energy distribution system may be a district heating system. If so the production plant is configured to produce heat and deliver the heat to the district thermal liquid of the feed line of the distribution grid. The distribution grid being a district heating grid. Further, the control server is configured to generate and send a control signal comprising information instructing the second local distribution system to reduce its outtake of heat from the distribution grid.

The district thermal energy distribution system may be a district cooling system. If so the production plant is configured to produce cold and deliver the cold to the district thermal liquid of the feed line of the distribution grid. The distribution grid being a district cooling grid. Further, the control server is configured to generate and send a control signal comprising information instructing the second local distribution system to reduce its outtake of cold from the distribution grid.

The above mentioned features of the first and second aspects, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION OF PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
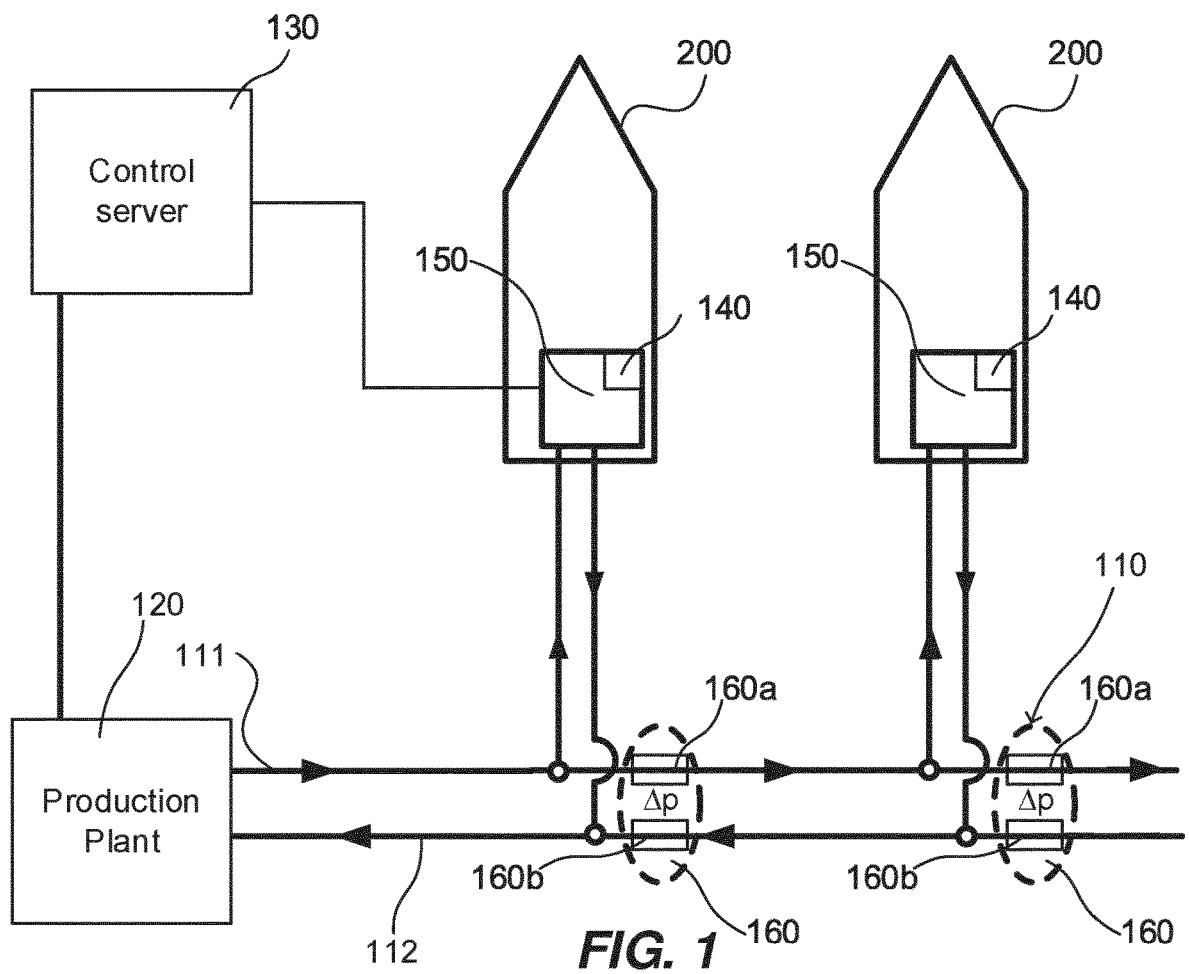
FIG. 1 illustrate a district thermal energy distribution system.

FIG. 1 shows a district thermal energy distribution system, comprising a district thermal energy distribution grid 110, a production plant 120, a control server 130 and a plurality of local distribution systems 150. The district thermal energy distribution system may be a district heating system. The district thermal energy distribution system may be a district cooling system. Below, when heat or heating is discussed the district thermal energy distribution system is to be seen as a district heating system, further, when cold or cooling is discussed the district thermal energy distribution system is to be seen as a district cooling system.

The production plant 120 is configured to produce heat or cold. The produced heat or cold is used for heating or cooling district thermal liquid circulated in the district thermal energy distribution grid 110. The production plant 120 may be a geothermal plant, an electrically powered plant for heating or cooling liquids, or may be driven by combustion of fuels such as gas or oil. It is only important that the production plant 120 is configured to heat or cool the district thermal liquid of the district thermal energy distribution grid 110. The district thermal energy distribution system may comprise more than one production plant 120.

The district thermal energy distribution grid 110 comprises a feed line 111 configured to feed district thermal liquid from the production plant 120 to local distribution systems 150 connected to the district thermal energy distribution grid 110. The district thermal energy distribution grid 110 further comprises a return line 112 configured to return district thermal liquid from the local distribution systems 150 to the production plant 120. The district thermal liquid may be any liquid suitable for transporting thermal energy. According to a non-limiting example, the district thermal liquid is water. However, according to other embodiments other district thermal liquid may be used. Some non-limiting examples are ammonia, oils, alcohols and anti-freezing liquids such as glycol. The heat transfer liquid may also comprise a mixture of two or more of the heat transfer liquids mentioned above, such as water mixed with an anti-freezing liquid or an anti-corrosion liquid.

The plurality of local distribution systems 150 are connected to the district thermal energy distribution grid 110. Each local distribution system 150 is associated with one of more buildings 200. A specific building 200 may be any type of building, such as a residential building, commercial or office building, an apartment building, a free-standing house or an industrial building. Each local distribution system 150 is configured to distribute heat or cold to the one of more buildings 200 it is associated with. Each local distribution system 150 is connected with the distribution grid 110 such that heat or cold may be exchanged between the distribution grid 110 and the local distribution system 150. The exchange of heat or cold between the distribution grid 110 and the local distribution system 150 may be made using a heat exchanger. Alternatively, the exchange of heat or cold between the distribution grid 110 and the local distribution system 150 may be made using a heat pump. Hence, the local distribution system 150 is thermally connected to the distribution grid 110 via a heat exchanger or a heat pump.

Each local distribution system 150 may be configured to distribute heat or cold in the thereto associated one or more buildings 200 via a heat transfer liquid. The heat transfer liquid of the local distribution system 150 is typically not in liquid connection with the heat transfer liquid of the distribution grid 110. The heat transfer liquid is typically water, although it is to be understood that other liquids or mixture of liquids may be used. Some non-limiting examples are ammonia, anti-freezing liquids (such as glycol), oils and alcohols. A non-limiting example of a mixture is water with an anti-freezing agent, such as glycol, added thereto. Hence, the heat exchanger or heat pump of the local distribution system 150 may be a liquid to liquid heat exchanger or heat pump.

In connection with each local distribution system 150 a local pressure difference determining device 160 is arranged in the distribution grid 110. Each local pressure difference determining device 160 is configured to determine a local pressure difference, $\Delta p$, of the distribution grid 110. The local pressure difference is preferably measured in the vicinity to where the respective local distribution system 150 is connected to the distribution grid 110. The local pressure difference determining device 160 may comprises a feed line pressure determining device 160a and a return line pressure determining device 160b. The feed line pressure determining device 160a is connected to the feed line 111 for measuring a local pressure of the district thermal liquid of the feed line 111. The return line pressure determining device 160b is connected to the return line 112 for measuring a local pressure of the district thermal liquid of the return line 112. The local pressure difference determining device 160 is configured to determine the local pressure difference as a pressure difference between the local pressure of the district thermal liquid of the feed line 111 and the local pressure of the district thermal liquid of the return line 112. Hence, the local pressure difference may be defined as a local pressure difference between a local pressure of the district thermal liquid of the feed line 111 and a local pressure of the district thermal liquid of the return line 112. The local pressure difference determining device 160 may be implemented as a hardware device, a software device, or as a combination thereof. The local pressure difference determining device 160 is configured to communicate data pertaining to the local pressure difference, $\Delta p$, to the control server 130.

The control server 130 may be any type of server comprising a processing unit. The control server 130 may physically comprise one single server device. Alternatively, the control server 130 may be distributed over several server devices. The control server 130 may be comprised in the production plant 120, or at any other suitable location.

The control server 130 is configured to determine a control signal associated with a respective one of the plurality of local distribution systems 150. As will be discussed in more detail below, each local distribution system 150 comprises a local control unit 140. The local control unit 140 is configured to regulate the local distribution system's 150 outtake of heat or cold from the distribution grid 110. The control signals generated by the control server 130 are targeted at the respective local control unit 140. Hence, the control server 130 is configured to determine a control signal for each of the plurality of local control units 140. Each respective control signal may be time resolved.

The control server 130 may further be configured to send each respective control signal to the respective local control unit 140. The respective local control unit 140 is configured to receive the respective control signal. For this the control server 130 and each local control units 140 comprises a respective transceiver. The communication between the transceivers may be via a dedicated network, over the Internet or a combination thereof. The communication in the dedicated network or the Internet may be wired communication, wireless communication or a combination thereof. The communication may be made over any suitable communication protocol. Non-limiting examples of a communication protocols are Modbus, TCP/IP, Profinet, Profibus, OPC, BACnet, LonTalk, M-bus and MQTT.

Figure 2:
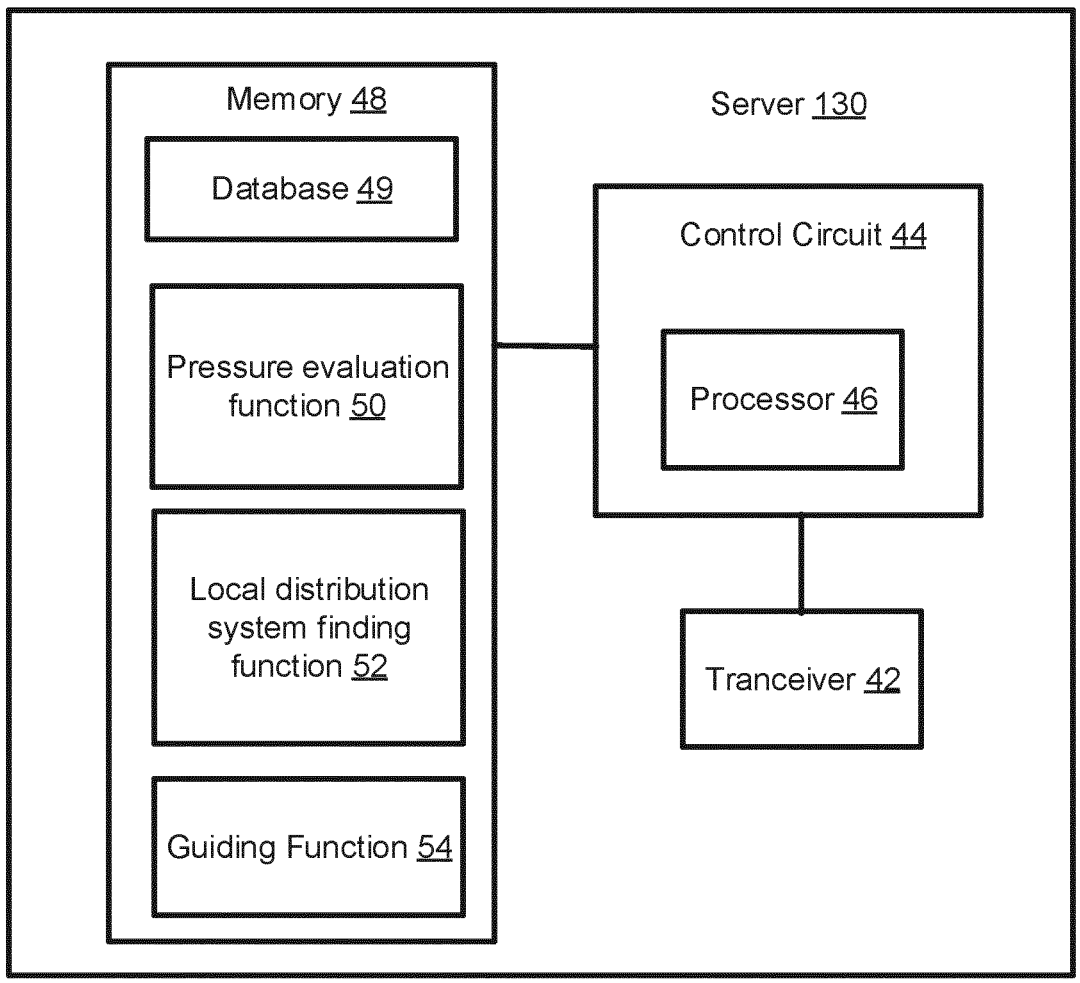
FIG. 2 illustrate a control server.

The control server 130 will now be discussed in more detail in connection with FIG. 2. The control server 130 comprises a transceiver 42, a control circuit 44 and a memory 48.

The transceiver 42 is configured to communicate with the local control units 140 of the local distribution systems 150. The transceiver 42 is configured to communicate individually with the control units 140 of the local distribution systems 150. The transceiver 42 is configured to communicate with the local pressure difference determining devices 160. The transceiver 42 is configured to communicate individually with the local pressure difference determining devices 160. Hence, the transceiver 42 enables the control server 130 to establish communications with other devices. That said, each of the plurality of control units 140 and each of the local pressure difference determining devices 160 may also comprises a respective transceiver for communicating with the control server 130. However, some of all of the local pressure difference determining devices 160 may communicate with the control server 130 via a control unit 140. The communications may include data transfers, and the like. Data transfers may include, but are not limited to, downloading and/or uploading data and receiving or sending messages. The data may be processed by the control server 130, the local pressure difference determining devices 160, and/or the plurality of control units 140. The processing may include storing the data in a memory, e.g. the memory 48 of the control server 40, executing operations or function, and so forth.

The control circuit 44 is configured to carry out overall control of functions and operations of the control server 130. The control circuit 44 may include a processor 46, such as a central processing unit (CPU), microcontroller, or microprocessor. The processor 46 is configured to execute program code stored in the memory 48, in order to carry out functions and operations of the server 40.

The memory 48 may be one or more of a buffer, a flash memory, a hard drive, a removable media, a volatile memory, a non-volatile memory, a random access memory (RAM), or another suitable device. In a typical arrangement, the memory 48 may include a non-volatile memory for long term data storage and a volatile memory that functions as system memory for the control circuit 48. The memory 48 may exchange data with the control circuit 44 over a data bus. Accompanying control lines and an address bus between the memory 48 and the control circuit 44 also may be present.

Functions and operations of the control server 130 may be embodied in the form of executable logic routines (e.g., lines of code, software programs, etc.) that are stored on a non-transitory computer readable medium (e.g., the memory 48) of the server 40 and are executed by the control circuit 44 (e.g., using the processor 46). Furthermore, the functions and operations of the server 40 may be a stand-alone software application or form a part of a software application that carries out additional tasks related to the server 40. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The control circuit 44 is configured to execute a pressure evaluation function 50. The pressure evaluation function 50 is configured to monitor local pressure differences reported by the local pressure difference determining devices 160. Especially, the pressure evaluation function 50 is configured to determine whether a local pressure difference is below a predetermined threshold. The predetermined threshold may be in the range of 0.5-0.05 MPa, as an hourly average. More preferable 0.3-0.075 MPa, as an hourly average. Most preferable, 0.2-0.1 MPa, as an hourly average. Upon a local pressure difference is below the predetermined threshold, the pressure evaluation function 50 is configured to generate a pressure alert signal. The pressure alert signal may comprise information identifying the local distribution system 150 associated with the local pressure difference determining device 160 that reported the local pressure difference that is below the predetermined threshold. The local distribution system 150 associated with the local pressure difference determining device 160 that reported the local pressure difference that is below the predetermined threshold will below be referred to as a first local distribution system. The pressure alert signal may further comprise information pertaining to a difference between the reported local pressure difference and the predetermined threshold.

The control circuit 44 is further configured to execute a local distribution system finding function 52. The local distribution system finding function 52 is configured to locate a local distribution system 150 to be controlled. The local distribution system 150 to be controlled will below be referred to as a second local distribution system. The second local distribution system is different from the first local distribution system. Especially, the local distribution system finding function 52 may configured to locate a second local distribution system that is connected to the distribution grid 110 upstream, seen along a flow path of the district thermal liquid from the local production plant 120, the first local distribution system.

The control circuit 44 is further configured to execute a control signal generating function 54. The control signal generating function 54 is configured to generate a control signal for the local control unit 140 associated with the second local distribution system 150. The control signal comprises information instructing the second local distribution system 150 to reduce its outtake of heat or cold from the distribution grid 110. The control signal may comprise information pertaining to how much the outtake of heat or cold shall be reduced. The amount of reduction of outtake of heat or cold may be dependent on a value of thermal inertia of the building being heated or cooled by the respective local distribution system 150. As will be discussed in more detail below, the control signal may be in the form of a percentage of reduction. Alternatively, the control signal may be in the form of an off-set in steering temperature. The control signal may be time-resolved. Hence, the control signal may comprise information for how long time the outtake of heat or cold shall be reduced. Thus, the control signal may relate to a temporary reduction in outtake of heat or cold. The length of the time period of temporary reduction of outtake of heat or cold may be dependent on a value of thermal inertia of the building being heated or cooled by the respective local distribution system 150.

The transceiver 42 is configured to send the control signal generated by the control signal generating function 54 to the local control unit 140 associated with the second local distribution system 150.

As mentioned above, each local distribution system 150 comprises a local control unit 140. The local control unit 140 is configured to control the local distribution system's 150 outtake of heat or cold from the district thermal energy distribution grid 110.

The local control unit 140 may be configured to determine a temperature from outside and/or inside of the one or more buildings 200 associated with the local distribution system 150 controlled by the local control unit 140. The local control unit 140 may be configured to decrease or increase the local distribution system's 150 outtake of heat or cold from the distribution grid 110 based on the determined temperature. The local control unit 140 may be configured to determine an amount of incoming solar radiation the building comprising the local distribution system 150 controlled by the local control unit 140 is being exposed for. The local control unit 140 may be configured to decrease or increase the local distribution system's 150 outtake of heat or cold from the distribution grid 110 based on the determined amount of incoming solar radiation.

Two examples of a local distribution systems 150a, 150b will now be described with reference to FIGS. 3a and 3b.

Figure 3A:
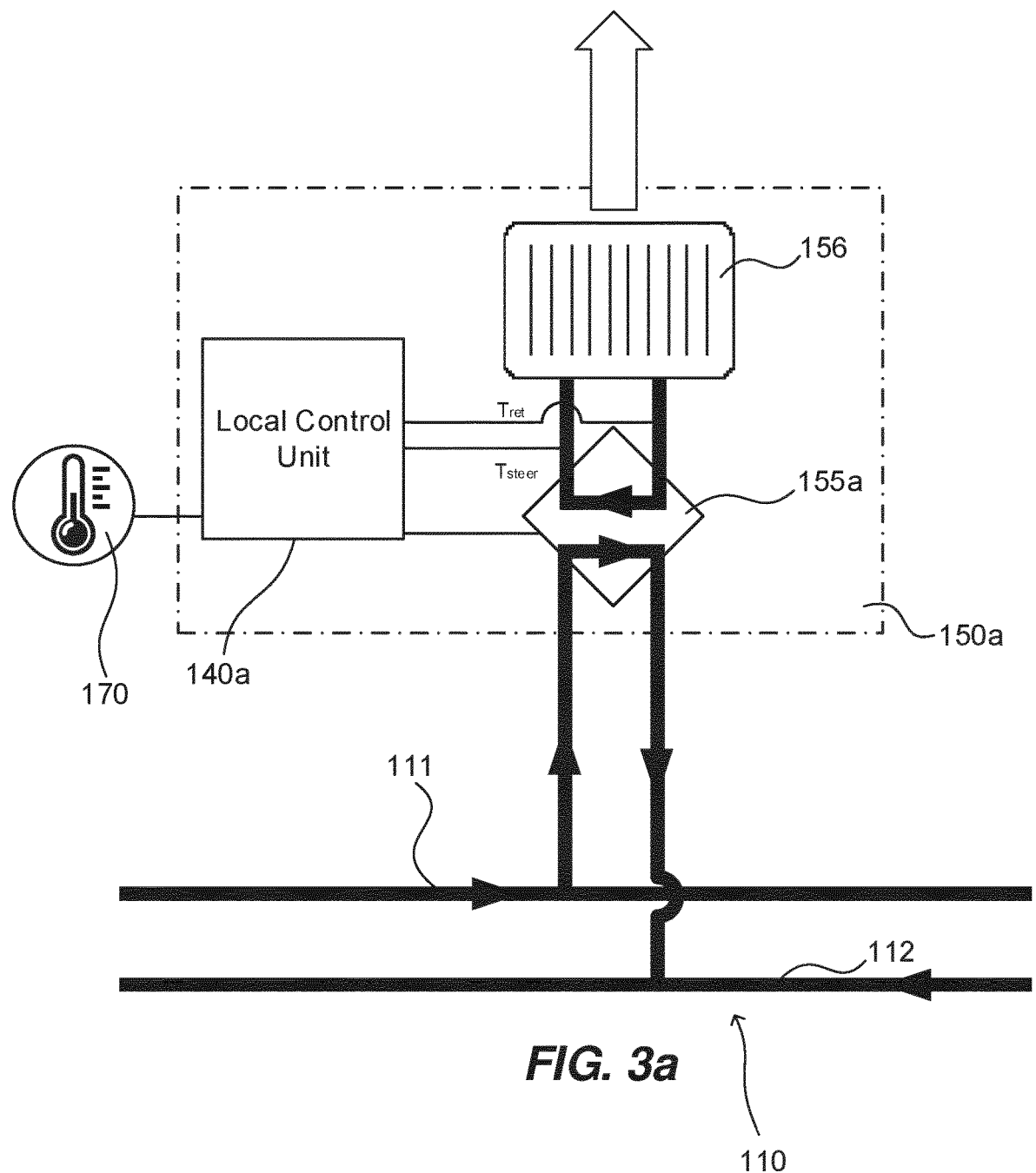
FIG. 3a illustrate a local distribution system configured to extract heat from a distribution grid in the form of a district heating grid.

The local distribution system 150a, illustrated in connection with FIG. 3a, is configured to distribute heating in a building. The heating may be in form of comfort heating, hot tap water, process heating and/or any other heating need of a building. The local distribution system 150a is connected to a distribution grid 110a in the form of a district heating grid. The local distribution system 150a comprises a local control unit 140a, a heat extractor 155a configured to exchange thermal energy between the distribution grid 110a and the local distribution system 150a, and a heat emitter 156. In the in FIG. 3a shown example the heat extractor 155a is a heat exchanger. However, the heat extractor 155a may instead be a heat pump. The use of a heat exchanger or heat pump is depending on the temperature of the heat transfer liquid in the distribution grid 110a and the wanted temperature of the heat transfer liquid of the local distribution system 150a. Via the heat extractor 155a, heat from the distribution grid 110a is distributed to the local distribution system 150a. Heat may thereafter be emitted to the building wherein the local distribution system 150a is located via the heat emitter 156. The local distribution system 150a may comprise one or more heat emitters 156.

The local control unit 140a is configured to control the associated local distribution system's 150a outtake of heat from the distribution grid 110a. Hence, the local control unit 140a is configured to decrease or increase the local heat distribution system's 150a outtake of heat from the distribution grid 110a. The outtake, at the heat extractor 155a, of heat from the distribution grid 110a to the local heat distribution system 150a may be regulated based on one or more values related to temperature. The values related to temperature may be one or more of the following values: a temperature, $T_{steer}$, of the local thermal liquid exiting the heat extractor 155a, a temperature, $T_{return}$, of local thermal liquid entering the heat extractor 155a, and a temperature. $T_{mes}$, outside the one or more buildings 200 associated with the local heat distribution system 150a. $T_{mes}$ is typically determined just outside the building wherein the local distribution system 150a is located. One or more of the one or more values related to temperature may be sensed by a respective temperature sensor. For example, a temperature sensor 170 may be configured to measure the temperature, $T_{mes}$, outside the building 200. The local control unit 140a may determine a base steering temperature based on $T_{mes}$ to be used as a set-point temperature. This set-point temperature may then be further adjusted based on a desired temperature inside the one or more buildings 200. The local control unit 140a may control the local heat distribution system's 150a outtake of heat from the distribution grid 110a via a steering signal $T_{steer}$. The local control unit 140a or the local heat distribution system 150a may comprise a PID-controller to control an outtake from the distribution grid 110a via the heat extractor 155a.

Figure 3B:
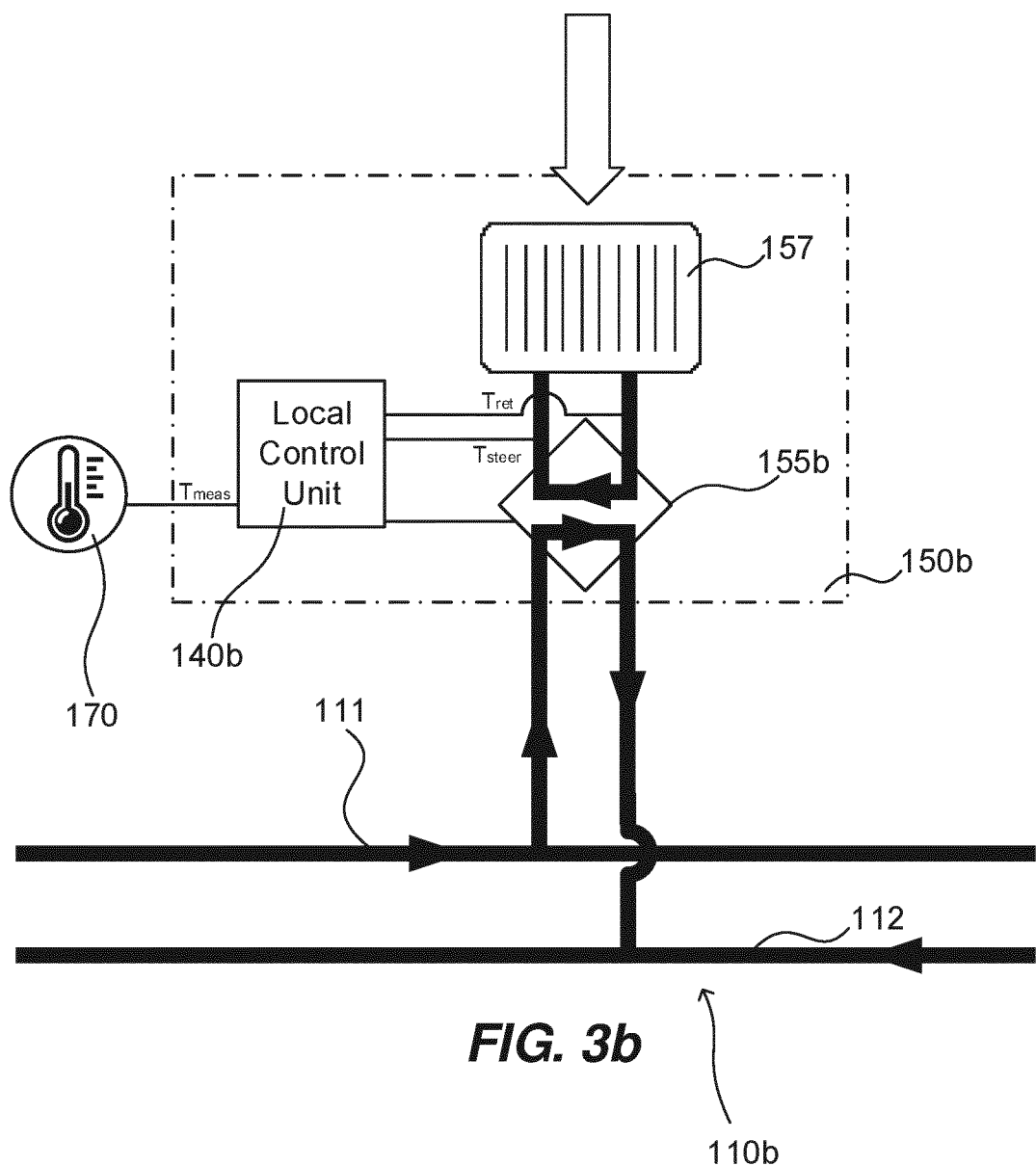
FIG. 3b illustrate a local distribution system configured to extract cold from a distribution grid in the form of a district cooling grid.

The local distribution system 150b, illustrated in connection with FIG. 3b, is configured to distribute cooling in a building. The cooling may be in form of comfort cooling, process cooling, refrigeration, freezing and/or any other cooling need of a building. The local distribution system 150b is connected to a distribution grid 110b in the form of a district cooling grid. The local distribution system 150b comprises a local control unit 140b, a cold extractor 155b configured to exchange thermal energy between the distribution grid 110b and the local distribution system 150b and a heat absorber 157. In the in FIG. 3b shown example the cold extractor 155b is a heat exchanger. However, the cold extractor 155b may instead be a heat pump. The use of a heat exchanger or heat pump is depending on the temperature of the heat transfer liquid in the distribution grid 110b and the wanted temperature of the heat transfer liquid of the local distribution system 150b. Via the cold extractor 155b, cold from the distribution grid 110b is distributed to the local distribution system 150b. Cold may thereafter be emitted to the building wherein the local distribution system 150b is located via the heat absorber 157. The local distribution system 150b may comprise one or more heat absorbers 157.

The local control unit 140b is configured to control the associated local distribution system's 150b outtake of cold from the distribution grid 110b. Hence, the local control unit 140b is configured to decrease or increase the local heat distribution system's 150b outtake of cold from the distribution grid 110b. The outtake, at the cold extractor 155b, of cold from the distribution grid 110b to the local heat distribution system 150b may be regulated based on one or more values related to temperature. The values related to temperature may be one or more of the following values: a temperature, $T_{steer}$, of the local thermal liquid exiting the cold extractor 155b, a temperature, $T_{return}$, of local thermal liquid entering the cold extractor 155b, and a temperature. $T_{mes}$, outside the one or more buildings 200 associated with the local heat distribution system 150b. $T_{mes}$ is typically determined just outside the building wherein the local distribution system 150b is located. One or more of the one or more values related to temperature may be sensed by a respective temperature sensor. For example, a temperature sensor 170 may be configured to measure the temperature, $T_{mes}$, outside the building 200. The local control unit 140b may determine a base steering temperature based on $T_{mes}$ to be used as a set-point temperature. This set-point temperature may then be further adjusted based on a desired temperature inside the one or more buildings 200. The local control unit 140b may control the local heat distribution system's 150b outtake of cold from the distribution grid 110b via a steering signal $T_{steer}$. The local control unit 140b or the local heat distribution system 150b may comprise a PID-controller to control an outtake from the distribution grid 110a via the cold extractor 155b.

As mentioned above, the local control unit 140 is adapted to receive a control signal from the control server 130. The local control unit 140 is further configured to adjust the local heat distribution system's 150 outtake of heat or cold from the distribution grid 110 based on the received control signal. The control signal may, for example, be a temperature offset. The offset may be an actual temperature value with which the local control unit 140 should adjust the outtake from the distribution grid 110. The actual value may be a positive or negative value. The offset may be a percentage value to be applied to a current or calculated outtake. Upon the control signal indicates a temperature value, the local control unit 140 may apply the value on the steering temperature $T_{steer}$. Upon the control signal indicates a percentage value the local control unit 140 may apply the percentage on the steering temperature $T_{steer}$. For example, the offset may be added or subtracted from the base steering temperature $T_{steer}$. The local control unit 140 may thereby determine a reduced or increased steering temperature. The reduced or increased steering temperature may be used until the control signal indicates a new offset. The outtake of heat or cold at the local heat distribution system 150 may be adapted accordingly. Each respective control signal may comprise data pertaining to a period of time for the adjustment of outtake of heat or cold from the distribution grid 110. The period of time may be in the range of hours to days and even weeks.

Figure 4:
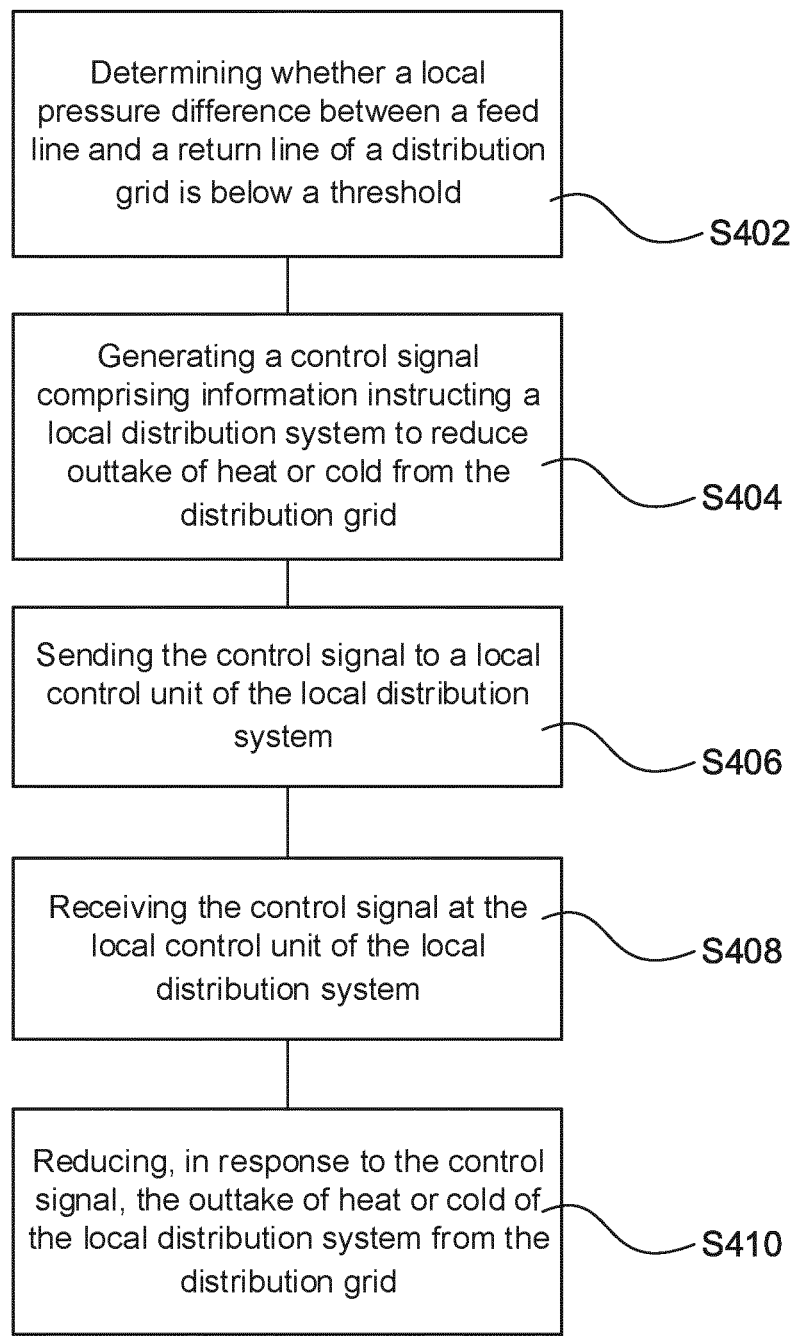
FIG. 4 is a block scheme of a method for controlling a district thermal energy distribution system.

With reference to FIG. 4 a method for controlling the above discussed district thermal energy distribution system will now be discussed. The district thermal energy distribution system may be a district heating system. The district thermal energy distribution system may be a district cooling system. The method comprises one or more of the following steps. It shall be understood that the steps of the method may be performed in any suitable order.

Determining S402 whether a local pressure difference between the feed line 111 and the return line 112 of the distribution grid 110 is below a predetermined threshold. The local pressure difference is measured at a location of the distribution grid 110 where a first local distribution system 150, of the plurality of local distribution systems 150 connected to the distribution grid 110, is connected to the distribution grid 110.

Upon the local pressure difference is determined to be below the predetermined threshold, generating S404 a control signal associated with a local control unit 140 of a second local distribution system (150). The control signal may be generated at the control server 130. The second local distribution system 150 being different from the first local distribution system 150. The second local distribution system 150 is preferably located upstream the first local distribution system 150, as seen along a flow direction of heart transfer liquid flowing in the feed line 111. Hence, the second local distribution system 150 is preferably located closer to the production plant than the first local distribution system 150, as seen along an extension of the distribution grid 110. The control signal comprises information instructing the second local distribution system 150 to reduce outtake of heat or cold from the distribution grid 110. As discussed in further detail above, the information instructing the second local distribution system 150 to reduce outtake of heat or cold from the distribution grid 110 may comprise an offset. In case the district thermal energy distribution system is a district heating system, the control signal comprises information instructing the second local distribution system 150 to reduce outtake of heat from the distribution grid 110. In case the district thermal energy distribution system is a district cooling system, the control signal comprises information instructing the second local distribution system 150 to reduce outtake of cold from the distribution grid 110.

Sending S406 the control signal to the local control unit 140 of the second local distribution system 150.

Receiving S408 the control signal at the local control unit 140 of the second local distribution system 150.

Reducing S410, in response to the control signal, the outtake of heat or cold of the second local distribution system 150 from the distribution grid 110. The reducing S410 the outtake of heat or cold of the second local distribution system 150 from the distribution grid 110 may comprise: determining, at the local control unit 140 of the second local distribution system 150, a steering temperature based on a temperature outside the building to which the second local distribution system 150 is configured to distribute heat or cold; adjusting, at the local control unit 140 of the second local distribution system 150, the steering temperature using the offset; and controlling the second local distribution system's outtake of heat or cold from the distribution grid 110 based on the adjusted steering temperature.

Hence, a method for controlling a district thermal energy distribution system is presented. The method comprises: determining S402 whether a local pressure difference between a feed line 111 and a return line 112 of a distribution grid 110 is below a predetermined threshold; upon the local pressure difference is determined to be below the predetermined threshold, generating S404 a control signal comprising information instructing a local distribution system 150 to reduce outtake of heat or cold from the distribution grid 110; sending S406 the control signal to a local control unit 140 of the local distribution system 150; and reducing S410, in response to the control signal, the outtake of heat or cold of the local distribution system 150 from the distribution grid 110.

The person skilled in the art realizes that the present invention by no means is limited to the preferred embodiments described above. On the contrary, many modifications and variations are possible within the scope of the appended claims.

For example, the control server 130 may further comprise a database 49. The database 49 may comprise entries of values of thermal inertia of the building 200 being heated or cooled by the respective local distribution system 150. The database 49 may further comprise entries of individual predetermined thresholds of local pressure difference for the local distribution systems 150 connected to the distribution grid 110. The database 49 does not need to be stored locally at the server 40. Hence, the database 49 may e.g. be a distributed database compiled using cloud computing.

As mentioned above, the control signal may comprise an off-set pertaining to how much the outtake of heat or cold shall be reduced. The off-set pertaining to how much the outtake of heat or cold shall be reduced may be made dependent on the thermal inertia of the building being heated or cooled by the second local distribution system 150. The thermal inertia of the building being heated or cooled by the second local distribution system 150 may be found in the database 49.

As also mentioned above, the control signal may comprise information related to for how long time the outtake of heat or cold shall be reduced. The time period of temporary reduction of outtake of heat or cold may be dependent on a value of thermal inertia of the building being heated or cooled by the second local distribution system 150. The thermal inertia of the building being heated or cooled by the second local distribution system 150 may be found in the database 49.

Additionally, variations to the disclosed embodiments can be understood and effected by the skilled person in practicing the claimed invention, from a study of the drawings, the disclosure, and the appended claims.

The invention claimed is:

1. A method for controlling a district thermal energy distribution system comprising:
    a distribution grid for a liquid based distribution of heat or cold, the distribution grid comprising a feed line and a return line;
    a production plant configured to:
        produce the heat or cold,
        deliver the heat or cold to a district thermal liquid of the distribution grid, and
        pump the heated or cooled district thermal liquid from the production plant out into the distribution grid; and
    a plurality of local control units, each local control unit being associated with a local distribution system connected to the distribution grid and configured to distribute the heat or cold in a building, each local control unit further being configured to control an outtake of the heat or cold of the associated local distribution system from the distribution grid, wherein the method comprises:
        determining whether a local pressure difference between the feed line and the return line of the distribution grid at a location of the distribution grid where a first local distribution system is connected to the distribution grid is below a predetermined threshold;
        upon the local pressure difference is determined to be below the predetermined threshold, generating a control signal associated with a local control unit of a second local distribution system, different from the first local distribution system, the control signal comprising information instructing the second local distribution system to reduce outtake of the heat or cold from the distribution grid;
        sending the control signal to the local control unit of the second local distribution system;
        receiving the control signal at the local control unit of the second local distribution system; and
        reducing, in response to the control signal, the outtake of the heat or cold of the second local distribution system from the distribution grid.

2. The method according to claim 1, wherein the step of determining whether the local pressure difference between the feed line and return line of the distribution grid at the location of the distribution grid where the first local distribution system is connected to the distribution grid is below the predetermined threshold comprises:
    measuring the local pressure difference between the feed line and return line at the location of the distribution grid where the first local distribution system is connected to the distribution grid; and
    comparing the measured local pressure difference with the predetermined threshold.

3. The method according to claim 1, wherein the second local distribution system is connected to the distribution grid upstream the first local distribution system as seen along a flow path of the district thermal liquid from the local production plant.

4. The method according to claim 1, wherein the information instructing the second local distribution system to reduce the outtake of the heat or cold from the distribution grid comprises an offset, wherein the step of reducing the outtake of the heat or cold of the second local distribution system from the distribution grid comprises:
    determining, at the local control unit of the second local distribution system, a steering temperature based on a temperature outside the building to which the second local distribution system is configured to distribute the heat or cold;
    adjusting, at the local control unit of the second local distribution system, the steering temperature using the offset; and
    controlling the second local distribution system's outtake of the heat or cold from the distribution grid based on the adjusted steering temperature.

5. A control server configured to control outtake of heat or cold from a distribution grid comprising a feed line and a return line, the control server comprising:
    a transceiver configured to communicate with control units of local distribution systems connected to the distribution grid, and with local pressure difference determining devices each configured to measure a local pressure difference of the distribution grid at a location of the distribution grid where the respective local distribution system is connected to the distribution grid; and
    a control circuit configured to execute:
        a pressure evaluation function configured to:
            monitor local pressure differences reported by the local pressure difference determining devices, determine whether a reported local pressure difference is below a predetermined threshold, and upon the reported local pressure difference is below the predetermined threshold, generate a pressure alert signal comprising information identifying a first local distribution system associated with the local pressure difference determining device that reported the local pressure difference being below the predetermined threshold;

a local distribution system finding function configured to locate a second local distribution system different from the first local distribution system; and a control signal generating function configured to generate a control signal for a local control unit associated with the second local distribution system, the control signal comprising information instructing the second local distribution system to reduce its outtake of the heat or cold from the distribution grid, wherein the transceiver is further configured to send the control signal to the local control unit associated with the second local distribution system.

6. The control server according to claim 5, wherein the local distribution system finding function is further configured to locate the second local distribution system upstream the first local distribution system as seen along a flow path of district thermal liquid in the feed line.

7. The control server according to claim 5, wherein the pressure alert signal further comprises information pertaining to a difference between the reported local pressure difference and the predetermined threshold.

8. The control server according to claim 5, further comprising a database comprising entries of individual predetermined thresholds of local pressure difference for the local distribution systems connected to the distribution grid.

9. The control server according to claim 5, wherein the control signal comprises an offset pertaining to how much the outtake of the heat or cold shall be reduced.

10. The control server according to claim 5, wherein the control signal comprises information related to how long time the outtake of the heat or cold shall be reduced.

11. The control server according to claim 9, further comprising a database comprising entries of thermal inertia of a building being heated or cooled by the respective local distribution system, wherein the offset pertaining to how much the outtake of the heat or cold shall be reduced is dependent on the thermal inertia of the building being heated or cooled by the second local distribution system.

12. The control server according to claim 10, further comprising a database comprising entries of thermal inertia of a building being heated or cooled by the respective local distribution system, wherein the time period of temporary reduction of the outtake of the heat or cold is dependent on a value of the thermal inertia of the building being heated or cooled by the second local distribution system.

13. A district thermal energy distribution system comprising:

a distribution grid for a liquid based distribution of heat or cold, the distribution grid comprising a feed line and a return line;

a plurality of local distribution systems connected to the feed and return lines of the distribution grid and configured to distribute the heat or cold in a building associated with the respective local distribution system;

a plurality of local control units, each local control unit being associated with a respective local distribution system of the plurality of local distribution systems, each local control unit being configured to control the thereto associated local distribution system's outtake of the heat or cold from the distribution grid;

a plurality of local pressure difference determining devices each being associated with a respective local distribution system and being configured to measure a local pressure difference of the distribution grid at a location of the distribution grid where the respective local distribution system is connected to the distribution grid; and the control server according to claim 5.

14. The district thermal energy distribution system according to claim 13, further comprising a production plant configured to produce the heat or cold and to deliver the heat or cold to a district thermal liquid of the feed line of the distribution grid.

15. The district thermal energy distribution system according to claim 13, wherein the district thermal energy distribution system is a district heating system, or wherein the district thermal energy distribution system is a district cooling system.

16. The control server according to claim 9, further comprising a database comprising entries of thermal inertia of a building being heated or cooled by the respective local distribution system, wherein the offset pertaining to how much the outtake of the heat or cold shall be reduced is dependent on the thermal inertia of the building being heated or cooled by the second local distribution system.

* * * * *